US009819211B2

(12) United States Patent
Vu et al.

(10) Patent No.: US 9,819,211 B2
(45) Date of Patent: Nov. 14, 2017

(54) WIRELESS CHARGING ASSEMBLY FOR A VEHICLE

(71) Applicant: Nissan North America, Inc., Franklin, TN (US)

(72) Inventors: Long Ngoc Vu, Farmington Hills, MI (US); Randall Johnson, White Lake, MI (US); Quan Cat, Canton, MI (US); Aaron Adams, Detroit, MI (US); Richard Galler, Ypsilanti, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 62 days.

(21) Appl. No.: 14/316,669

(22) Filed: Jun. 26, 2014

(65) Prior Publication Data

US 2015/0380970 A1    Dec. 31, 2015

(51) Int. Cl.
  *H02J 7/02*    (2016.01)
  *H02J 7/00*    (2006.01)
  *H02J 50/10*   (2016.01)

(52) U.S. Cl.
  CPC ............ *H02J 7/025* (2013.01); *H02J 7/0044* (2013.01); *H02J 50/10* (2016.02)

(58) Field of Classification Search
  CPC .......... H02J 7/025; H02J 7/0044; H02J 5/005; B60L 11/182; B60R 11/0235
  USPC ........................................................ 320/108
  See application file for complete search history.

(56) References Cited

U.S. PATENT DOCUMENTS

| 3,580,115 | A | * | 5/1971 | Thompson | B25B 13/14 |
| | | | | | 81/165 |
| 4,469,365 | A | * | 9/1984 | Marcus | B60R 7/082 |
| | | | | | 224/311 |
| 6,075,229 | A | | 6/2000 | Vanselow | |
| 6,670,583 | B2 | | 12/2003 | Kara | |
| 6,906,495 | B2 | | 6/2005 | Cheng et al. | |
| 6,960,968 | B2 | | 11/2005 | Odendaal et al. | |
| 7,566,984 | B2 | | 7/2009 | Blanchard | |
| 8,310,200 | B2 | | 11/2012 | Matouka et al. | |
| 8,482,160 | B2 | | 7/2013 | Johnson et al. | |
| 9,229,494 | B2 | * | 1/2016 | Rayner | G06F 1/163 |
| 2003/0045332 | A1 | * | 3/2003 | Lopez | B60R 11/0241 |
| | | | | | 455/569.2 |
| 2004/0145343 | A1 | | 7/2004 | Naskali et al. | |
| 2006/0043927 | A1 | | 3/2006 | Beart et al. | |
| 2007/0072474 | A1 | | 3/2007 | Beasley et al. | |

(Continued)

FOREIGN PATENT DOCUMENTS

WO    2012-081028 A1    6/2012

*Primary Examiner* — Drew A Dunn
*Assistant Examiner* — Sailesh Thapa
(74) *Attorney, Agent, or Firm* — Global IP Counselors, LLP

(57) ABSTRACT

A wireless charging assembly for a passenger compartment of a vehicle includes a vehicle component, a wireless charger and a connection structure. The wireless charger includes a charger housing and at least one primary induction coil disposed in the charger housing. A support structure is connected to the charger housing for securing the portable electronic device to the charger housing. The connection structure movably connects the charger housing to the vehicle component such that the charger housing is movable between a stowed position and an in-use position.

7 Claims, 7 Drawing Sheets

(56) References Cited

U.S. PATENT DOCUMENTS

| | | | |
|---|---|---|---|
| 2008/0108329 A1* | 5/2008 | Cho | H04L 12/66 455/413 |
| 2009/0122430 A1 | 5/2009 | De Ward et al. | |
| 2009/0212639 A1 | 8/2009 | Johnson | |
| 2010/0165219 A1* | 7/2010 | Ikunami | B60R 11/0235 348/836 |
| 2010/0315041 A1* | 12/2010 | Tan | H02J 7/0044 320/115 |
| 2011/0121148 A1* | 5/2011 | Pernia | B60R 11/0229 248/207 |
| 2012/0120239 A1* | 5/2012 | Hutzel | B60R 1/008 348/143 |
| 2012/0140126 A1* | 6/2012 | Werth | B60R 11/0235 348/837 |
| 2012/0147612 A1 | 6/2012 | Verhoeven et al. | |
| 2012/0235474 A1 | 9/2012 | Mannino et al. | |
| 2013/0038280 A1 | 2/2013 | Boundy et al. | |
| 2013/0088195 A1 | 4/2013 | Yoon et al. | |
| 2013/0154555 A1 | 6/2013 | Miller et al. | |
| 2013/0249682 A1 | 9/2013 | Van Wiemeersch et al. | |
| 2013/0285603 A1 | 10/2013 | Zeinstra et al. | |
| 2014/0006669 A1* | 1/2014 | Klein | B60R 11/02 710/303 |
| 2014/0009900 A1* | 1/2014 | Yeo | H04B 1/3888 361/809 |
| 2014/0091192 A1* | 4/2014 | Mersky | F16M 11/041 248/447 |
| 2015/0115877 A1* | 4/2015 | Arai | H02J 7/0042 320/108 |

\* cited by examiner

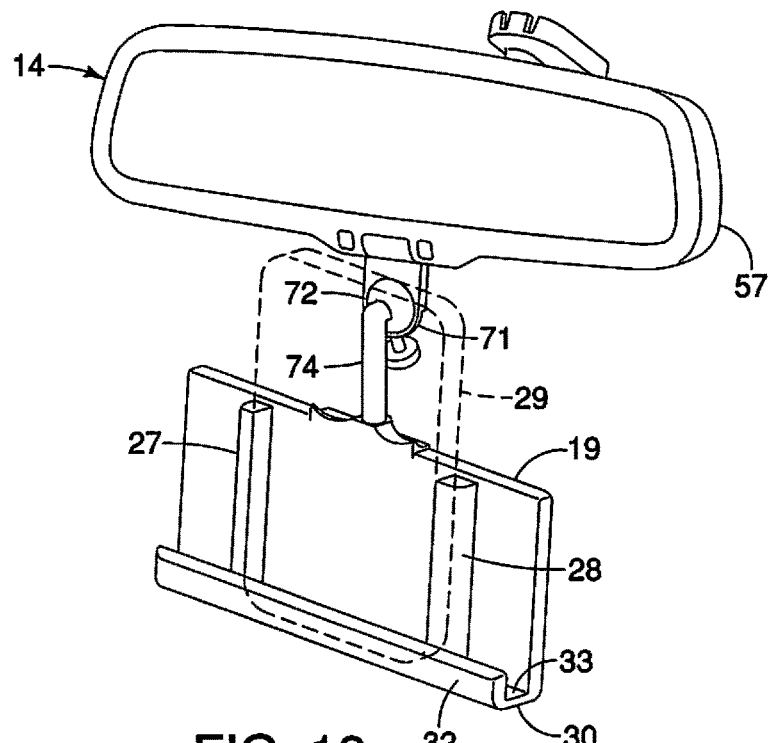
FIG. 18
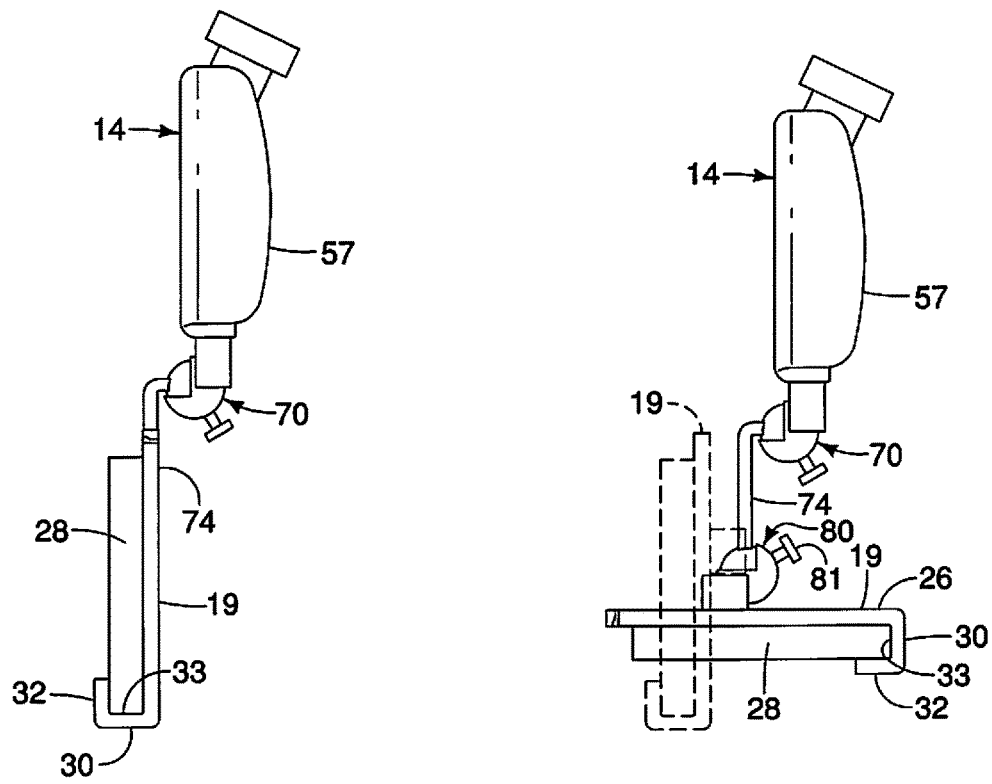
FIG. 19
FIG. 20

US 9,819,211 B2

WIRELESS CHARGING ASSEMBLY FOR A VEHICLE

FIELD OF THE INVENTION

The present invention generally relates to a wireless charging assembly for a vehicle. More specifically, the present invention relates to a vehicle configured to wirelessly charge a portable electronic device within a passenger compartment of the vehicle.

BACKGROUND INFORMATION

As the prevalence and use of portable electronic devices grows, a demand for use of portable electronic devices in vehicles continues to increase. Vehicles are often equipped to accommodate use and charging of the portable electronic devices through electrical adapters, which are typically plugged into existing vehicle power sources, such as power sockets. However, the wires associated with conventional power adapters are unsightly and impede manipulation and operation of the portable electronic devices while connected to the power sources.

Additionally, plugging the power adapters into the portable electronic devices can be difficult and result in damage to the power jacks, such that the portable electronic device cannot be charged, thereby rendering the portable electronic device useless.

Furthermore, because the power adapters are plugged into power sockets of the vehicles and the wires are unsightly, the power adapters are typically unplugged from the power sockets when not in use. Thus, the power adapters are easily misplaced or lost, thereby preventing the portable electronic devices from being charged.

Accordingly, a need exists for a wireless charging assembly for a passenger compartment of a vehicle that provides quick and easy wireless charging of a portable electronic device.

SUMMARY

In view of the state of the known technology, one aspect of the present invention is a wireless charging assembly for a passenger compartment of a vehicle including a vehicle component, a wireless charger and a connection structure. The wireless charger includes a charger housing and at least one primary induction coil disposed in the charger housing. A support structure is connected to the charger housing for securing the portable electronic device to the charger housing. The connection structure movably connects the charger housing to the vehicle component such that the charger housing is movable between a stowed position and an in-use position.

Another aspect of the present invention provides a vehicle configured for wirelessly charging a portable electronic device within a passenger compartment of the vehicle. The vehicle includes a vehicle power system and a vehicle component positioned in the passenger compartment of the vehicle. A wireless charging assembly includes a charger housing and at least one primary induction coil disposed in the charger housing. A support structure is connected to the charger housing for securing the portable electronic device to the charger housing. A controller is disposed in the vehicle component. The controller is positioned proximate to the charger housing and electrically coupled to the vehicle power system and to the at least one primary induction coil. A connection structure movably connects the charger housing to the vehicle component such that the charger housing is movable between a stowed position and an in-use position.

Yet another aspect of the present invention provides a vehicle configured for wirelessly charging a portable electronic device within a passenger compartment of the vehicle. The vehicle includes a vehicle power system, a driver seat and a windshield positioned forward of the driver seat. A rear-view mirror is mounted to the windshield and faces the driver seat. The rear-view mirror has a mirror housing. A wireless charging assembly includes a charger housing having a charging surface and at least one primary induction coil disposed in the charger housing. A support structure is connected to the charger housing for securing the portable electronic device to the charger housing. The support structure includes a pair of support members movable relative to the charging surface of the charger housing. A flange extends from the charger housing. The flange includes a lip extending from the flange substantially parallel with the charger housing. The charger housing, the flange and the lip define a channel configured to receive the portable electronic device. A controller is disposed in the mirror housing. The controller is positioned proximate to the charger housing and is electrically coupled to the vehicle power system and to the at least one primary induction coil. A connection structure movably connects the charger housing to the mirror housing such that the charger housing is movable between a stowed position and an in-use position.

BRIEF DESCRIPTION OF THE DRAWINGS

Referring now to the attached drawings which form a part of this original disclosure:

FIG. 18 is a perspective view of the wireless charging assembly of FIG. 16 in which the telescoping arm is extended;

FIG. 19 is a side elevational view of a wireless charging assembly having a ball joint connection to move the wireless charging assembly to a stowed position; and FIG. 20 is a side elevational view of a wireless charging assembly having first and second ball joints.

DETAILED DESCRIPTION OF EXEMPLARY EMBODIMENTS

Selected exemplary embodiments will now be explained with reference to the drawings. It will be apparent to those skilled in the art from this disclosure that the following descriptions of the exemplary embodiments are provided for illustration only and not for the purpose of limiting the invention as defined by the appended claims and their equivalents.

Figure 1:
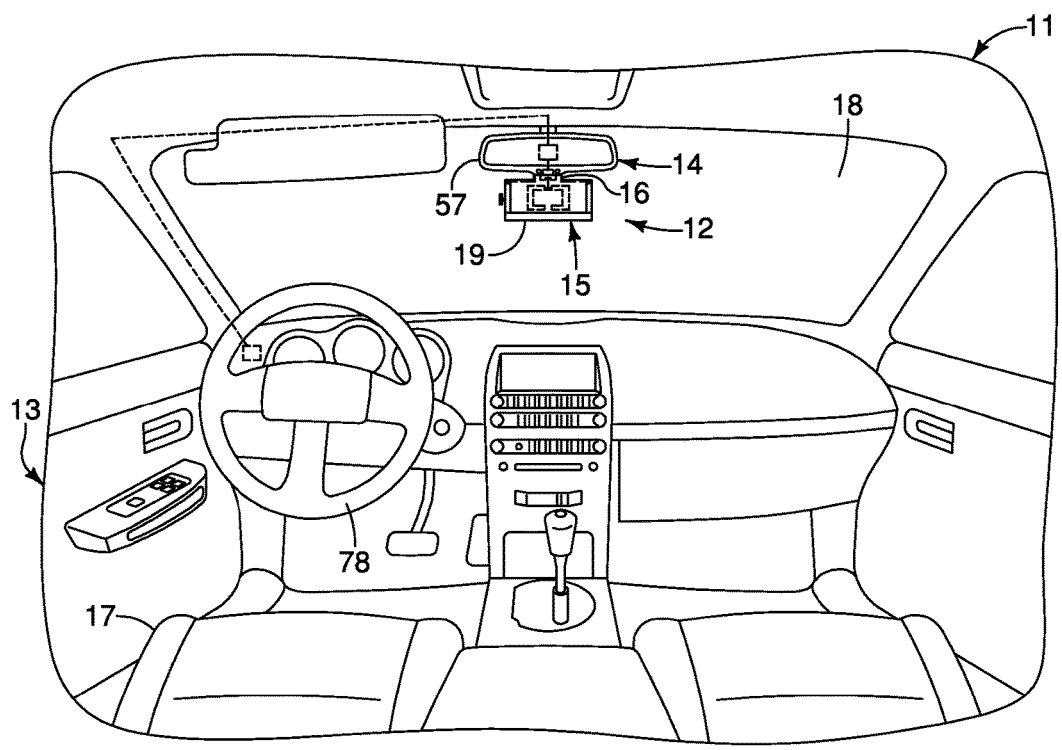
FIG. 1 is a perspective view of a wireless charging assembly disposed in a passenger compartment of a vehicle.
Figure 2:
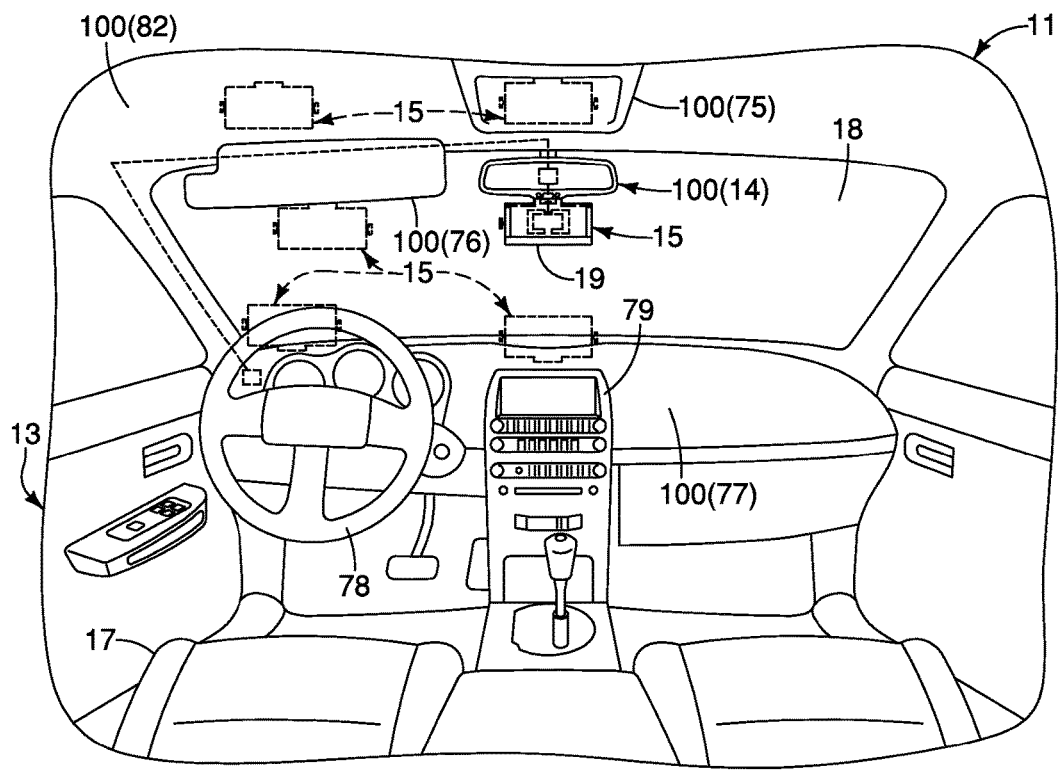
FIG. 2 is a perspective view of various mounting locations of a wireless charging assembly within a passenger compartment of a vehicle.

As shown in FIG. 1, a vehicle 11 in accordance with an exemplary embodiment of the present invention includes a wireless charging assembly 12 for a passenger compartment 13 of the vehicle 11. The wireless charging assembly 12 includes a vehicle component 100, such as a rear-view mirror 14, a wireless charger 15 and a connection structure 16 for movably connecting the wireless charger 15 to the vehicle component 100. The passenger compartment 13 includes a driver seat 17 and a windshield 18 positioned forward of the driver seat 17. The rear-view mirror 14 is connected to the windshield 18 or roof structure 82, as shown in FIGS. 1 and 2, and the charger housing 19 is disposed below the rear-view mirror 14. The charger housing 19 is positioned between the driver seat 17 and the windshield 18 such that a portable electronic device 29, when positioned in the charger housing 19, is visible from the driver seat 17.

The charger housing 19 can be connected to any suitable vehicle component 100, such as, but not limited to, the rear-view mirror 14, an overhead console 75, a visor 76, a dashboard 77 or the roof structure 82, as shown in FIGS. 1 and 2. When the vehicle component 100 is the rear-view mirror 14, the overhead console 75 or the visor 76, the charger housing 19 is preferably disposed beneath the vehicle component 100. When the vehicle component 100 is the dashboard 77, the charger housing 19 is preferably disposed above the dashboard 77. As shown in FIG. 2, the charger housing 19 can be connected to the dashboard 77 at any suitable location, such as behind a steering wheel 78 or at a substantially centered position over a center stack 79 on the dashboard 77.

Figure 3:
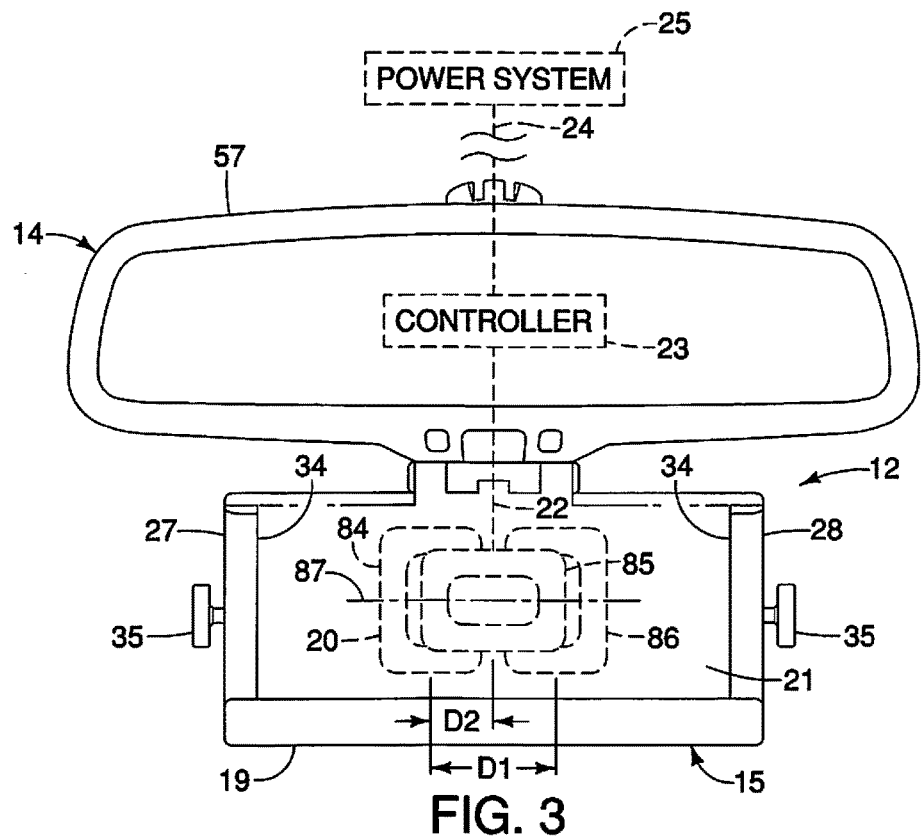
FIG. 3 is a front elevational view of a wireless charging assembly mounted to a mirror including a wiring diagram.
Figure 4:
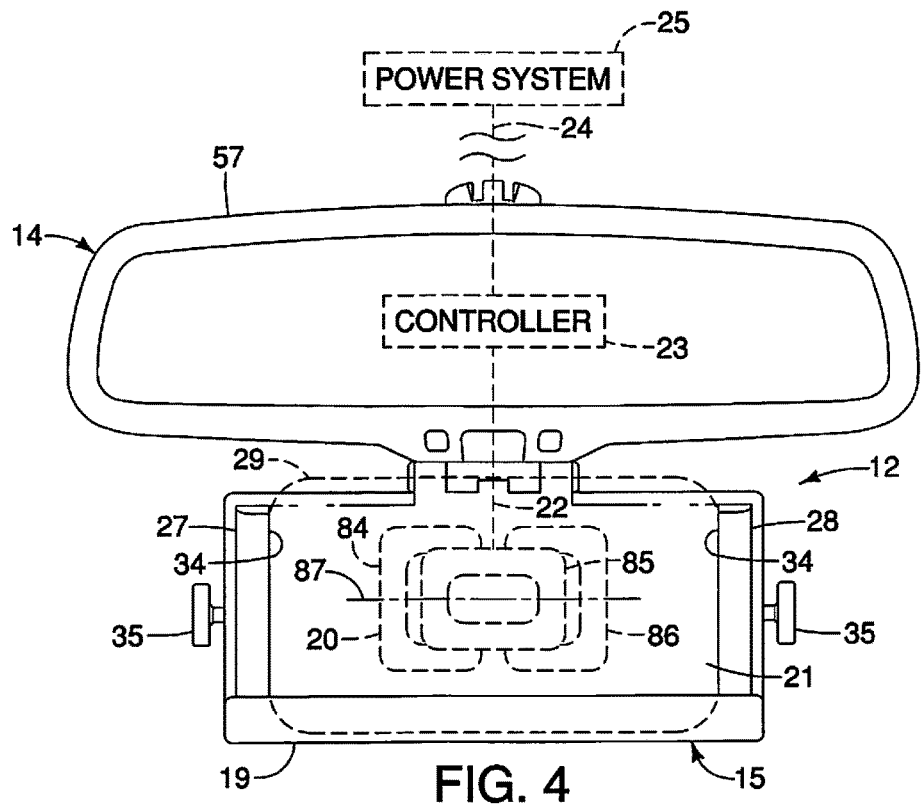
FIG. 4 is a front elevational view of the wireless charging assembly of FIG. 3 receiving an electronic device.
Figure 8:
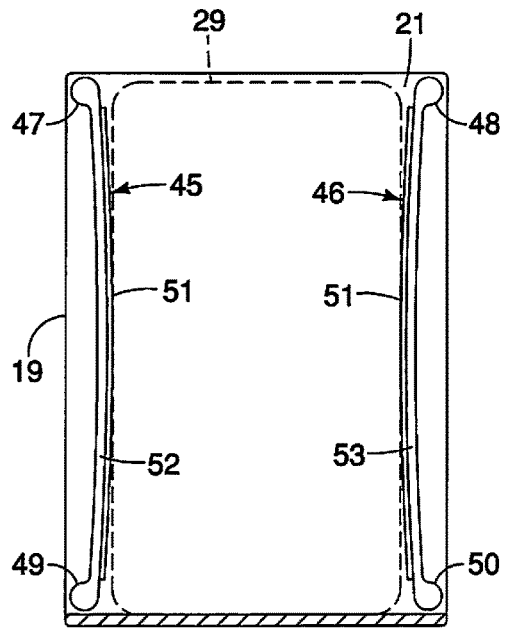
FIG. 8 is a front elevational view of the wireless charging assembly of FIG. 6 receiving an electronic device.

As shown in FIG. 3, the wireless charger 15 of the wireless charging assembly 12 includes a charger housing 19 and at least one primary, or transmitting, induction coil 20 disposed therein. The charger housing 19 includes a charging surface 21. The primary coil 20 is disposed in the charger housing 19 between the charging surface 21 and a rear surface 26 (FIG. 11) thereof. The connection structure 16 allows the charger housing 19 to be movable between a stowed position shown in FIG. 11 and an in-use position shown in FIG. 3. The charger housing 19 can be connected to the vehicle component 100 such that the portable electronic device 29 is received in a horizontal or landscape orientation as shown in FIG. 4, or in a vertical or portrait position as shown in FIG. 8.

The portable electronic device 29 can be, but is not limited to, a cell phone, a personal navigation device, or an mp3 player.

Figure 9:
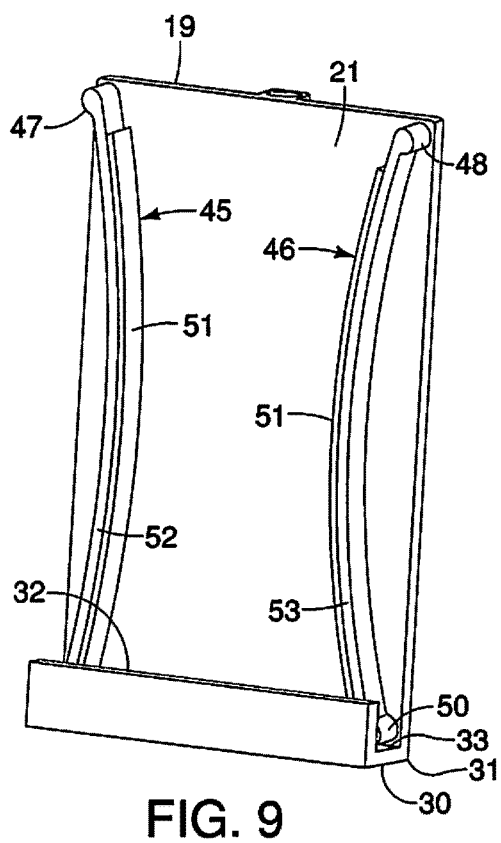
FIG. 9 is a perspective view of the wireless charging assembly of FIG. 7.
Figure 10:
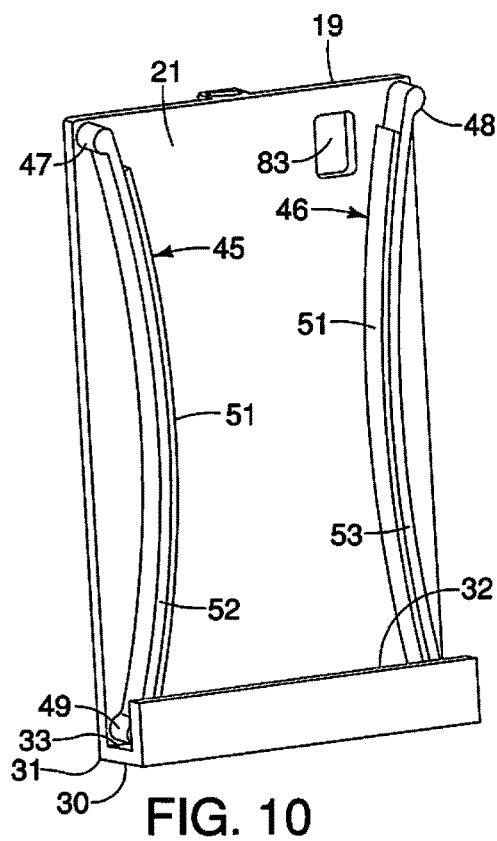
FIG. 10 is a perspective view of a charger housing including a camera opening.

As shown in FIG. 3, the charger housing 19 can have a landscape orientation such that a width dimension of the housing is larger than a height dimension. Alternatively, as shown in FIG. 9, the charger housing 19 can have a portrait orientation such that a height dimension is larger than a width dimension. The charger housing 19 can also include an opening 83, as shown in FIG. 10, extending from the charging surface 21 to the rear surface 26. The opening 83 is disposed in the charger housing 19 to be aligned with a camera of the portable electronic device 29 such that camera functions of the portable electronic device can be used when the portable electronic device is received by the charger housing 19. Power-intensive camera functions, such as lane deviation warning applications, can be used while continuing to charge the portable electronic device 29.

Any suitable number of primary coils 20, such as a three coil configuration as shown in FIG. 3, can be disposed in the charger housing 19. Additional primary coils 20 increases the electromagnetic field generated by the primary coils, thereby facilitating alignment of the portable electronic device 29 with the wireless charger 15. More primary coils 20 may also increase the speed at which the portable electronic device 29 is recharged. Each of the primary coils 20, as shown in FIG. 3, is electrically connected by a power line 22 to a controller 23, which is electrically connected by a power line 24 to a vehicle power system 25. The primary coils 20 receive power from the vehicle power system 25 to create the electromagnetic field. A secondary, or receiving, induction coil (not shown) is disposed in the portable electronic device 29. When the secondary coil is disposed within the electromagnetic field generated by the at least one primary coil 20, current is generated within the secondary coil of the portable electronic device 29. The current flowing within the secondary coil is converted into direct current, thereby charging a battery of the portable electronic device 29.

An exemplary coil configuration is shown in FIG. 3, although any suitable configured can be used. At least three primary coils 20 are disposed in a partially overlapping configuration, such that a second coil 85 partially overlaps first and third coils 84 and 86. The three primary coils 84, 85 and 86 have substantially rectangular shapes and are aligned on a common axis 87. The first and third coils 84 and 86 are disposed adjacent to one another with a first distance D1 therebetween and are centered on the axis 87 in a vertical orientation. The second coil 85 is disposed substantially perpendicular to the first and third primary coils 84 and 85 such that the second coil is centered on the axis 87 in a horizontal configuration. A second distance D2 is disposed between a center of the second coil 85 and each of the centers of the first and third coils 84 and 86.

The controller 23 is preferably disposed proximate the primary induction coils 20, such as in the vehicle component 100, to manage power loss between the controller 23 and the primary induction coils 20. When the charger housing 19 is connected to the rear-view mirror 14, the controller 23 is preferably disposed in a rear-view mirror housing 57, thereby allowing the freedom to position and include multiple primary induction coils 20 in the charger housing 19. Additionally, the size of the charger housing 19 can be minimized, thereby reducing cost, reducing weight and increasing visibility within the passenger compartment 13.

Figure 11:
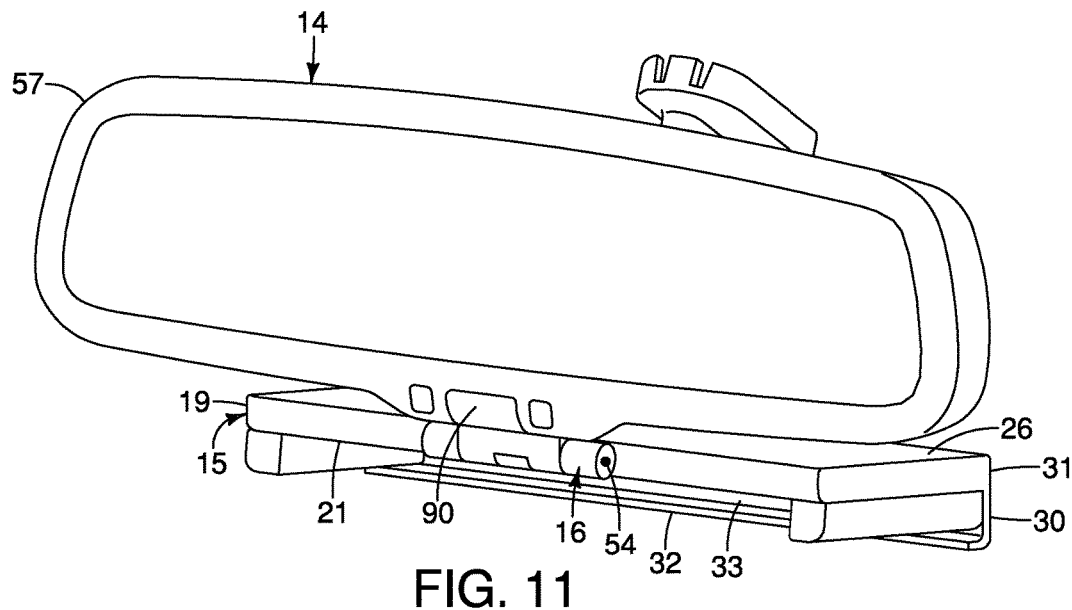
FIG. 11 is a perspective view of a wireless charging assembly rotated to a stowed position.

The support structure is connected to the charger housing 19 for securing the portable electronic device 29 thereto. The support structure includes a flange 30 extending outwardly from the charger housing 19 (e.g., from the charging surface 21 or a lower surface 31), as shown in FIG. 11. A lip 32 extends upwardly from an end of the flange 30 opposite the charging surface 21. A channel 33 is defined by the charging surface 21, the flange 30 and the lip 32 and is configured to receive the portable electronic device 29 therein, as shown in FIG. 4. The surfaces of the flange 30 and the lip 32 defining the channel 33 can have a gripping surface disposed thereon, such as rubber, to facilitate securely receiving the portable electronic device 29.

As shown in FIGS. 3 and 4, the support structure includes first and second movable arms 27 and 28 that are movable within the channel 33 relative to the charging surface 21. The movable arms 27 and 28 are moved toward one another to secure the portable electronic device 29 to the charger housing 19. As shown in FIG. 3, a gripping surface 34, such as rubber, can be disposed on the movable arms 27 and 28 to further facilitate securing the portable electronic device 29 to the charger housing 19.

Figure 5:
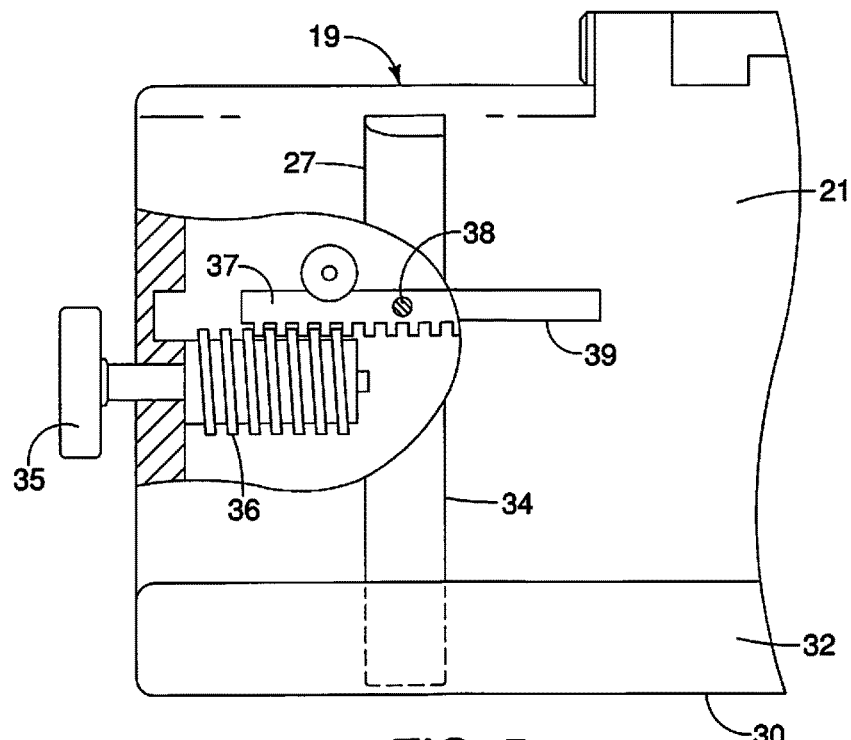
FIG. 5 is a rear elevational view of a worm rack assembly configured to move arms of a wireless charging assembly.

As shown in FIG. 5, the movable arms 27 and 28 can be moved relative to the charging surface 21 by a worm rack assembly, which includes a thumb screw 35 rigidly fixed to a worm gear 36. The threads of the worm gear 36 engage a rack 37 linearly moveable within the charger housing 19. Rotation of the thumb screw 35 causes rotation of the worm gear 36, thereby linearly moving the rack 37. A pin 38 fixes the rack 37 to the moveable arm 27. The pin 38 is received in a track 39 in the charging surface 21 to guide movement of the pin 38 as the rack 37 moves. The track 39 extends substantially parallel to the flange 30. Rotation of the thumb screw 35 clockwise moves the rack 37 in a first direction, and rotation of the thumb screw 35 counter-clockwise moves the rack 37 in a second direction opposite to the first direction. The second moveable arm 28 is configured in a substantially similar manner. The thumb screws 35 are rotated to linearly move the moveable arms 27 and 28 to positions in which the moveable arms 27 and 28 securely retain and selectively position the portable electronic device 29 therebetween.

Figure 6:
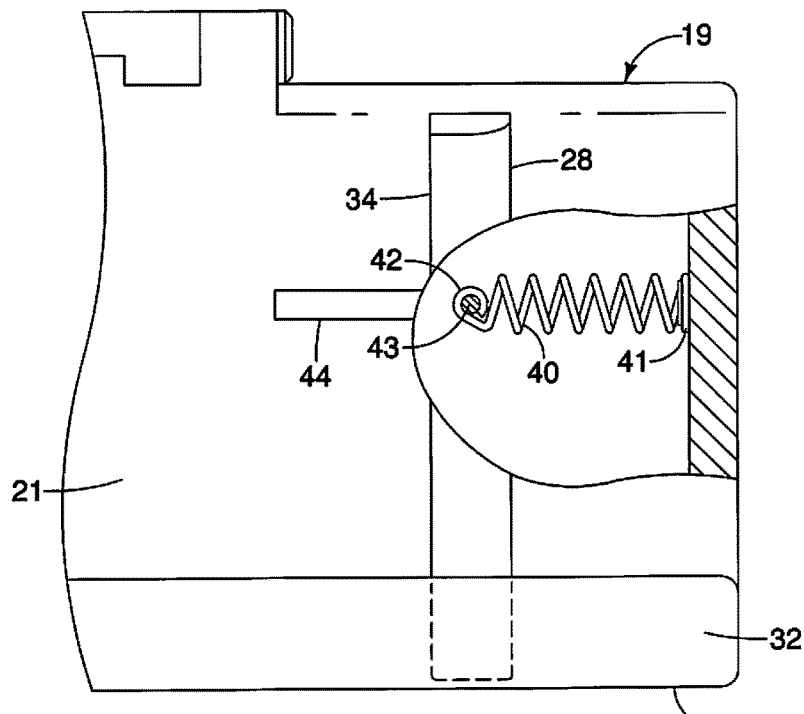
FIG. 6 is a rear elevational view of a biasing member configured to move arms of a wireless charging assembly.

Alternatively, the moveable arms 27 and 28 can be moved relative to the charging surface 21 by a biasing member 40, such as a compression spring, as shown in FIG. 6. The biasing member 40 has a first end 41 fixed within the charger housing 19. One end of a pin 43 is connected proximate a second end 42 of the biasing member 40, and the other end of the pin 43 is connected to the second moveable arm 28. The pin 43 is received by a track 44 to guide movement of the pin 43. The track 44 extends substantially parallel to the flange 30. The first moveable arm 27 is configured in a substantially similar manner. The biasing members 40 bias the first and second moveable arms 27 and 28 toward one another. The moveable arms 27 and 28 are moved away from one another against the forces of the biasing members 40 as the portable electronic device 29 is inserted therebetween, thereby securing the portable electronic device 29 therebetween. The biasing members 40 return the moveable arms 27 and 28 to a position near one another when the portable electronic device 29 is removed.

Figure 7:
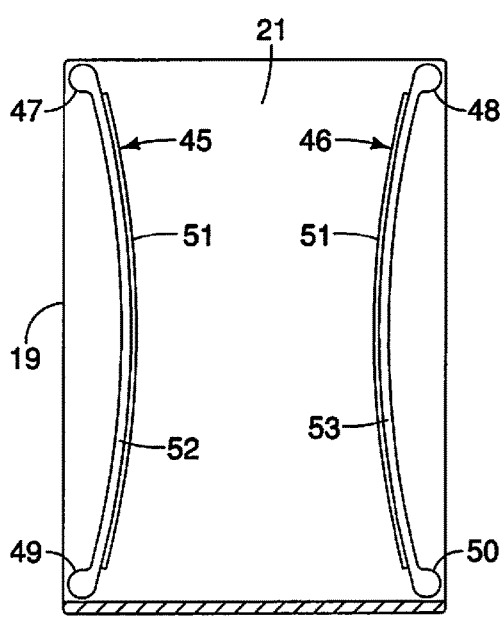
FIG. 7 is a front elevational view of a flexible member of a wireless charging assembly configured to receive an electronic device.

As shown in FIGS. 7-9, the support structure includes first and second flexible members 45 and 46 for securing the portable electronic device 29 to the charger housing 19. The flexible members 45 and 46 have body portions 52 and 53 connected to the charger housing 19 by first pins 47 and 48 and second pins 49 and 50, respectively. The pins 47-50 are pivotably connected to the charger housing 19 to accommodate flexing of the first and second body members 52 and 53 relative to the charging surface 21, as shown in FIGS. 7 and 8. As shown in FIG. 7, the flexible members 45 and 46 are substantially arcuately shaped such that the body portions 52 and 53 bow toward one another. Inserting a portable electronic device 29 between the flexible members 45 and 46 causes the body portions 52 and 53 to flex away from one another, as shown in FIG. 8. A gripping surface 51 can be disposed on the body portions 52 and 53 to facilitate securely receiving the portable electronic device 29. The gripping surface 51 can be made of any suitable material, such as rubber. When the portable electronic device 29 is removed, the body portions 52 and 53 return to the bowed positions, as shown in FIG. 7.

The connection structure 16 movably connects the wireless charger 15 to the vehicle component 100, such as the rear view mirror 14, as shown in FIGS. 1 and 11. The connection structure 16 allows the charger housing 19 to be moved between an in-use position, such as a vertical position shown in FIG. 1, and a stowed position, such as a horizontal position shown in FIG. 11.

Figure 12:
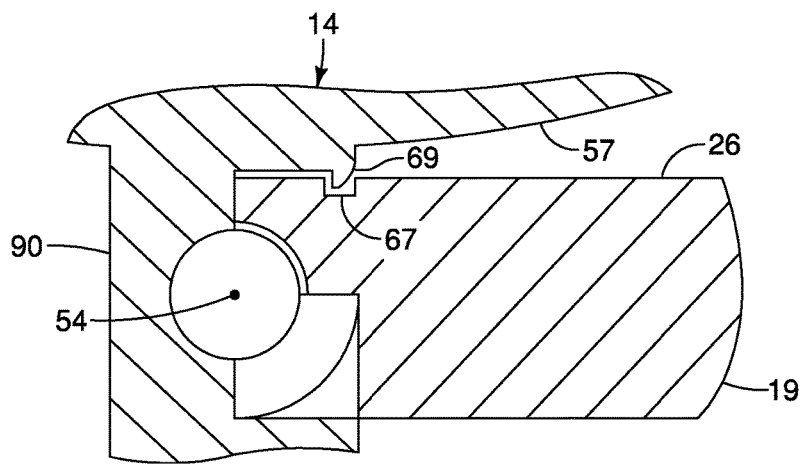
FIG. 12 is a side elevational view in cross-section of a locking detent of the wireless charging assembly of FIG. 11.

The connection structure 16 can be any suitable connection allowing rotation of the charger housing 19 about a rotational axis 54, as shown in FIG. 12, relative to the vehicle component 100. Preferably, the connection structure 16 enables the charger housing 19 to be disposed at any position on the rotational axis 54. For example, the connection structure 16 can be a friction hinge, such as a friction disk assembly 55 as shown in FIG. 13, a roll pin assembly 61 as shown in FIG. 14 or a question-mark band assembly 64 as shown in FIG. 15.

Figure 13:
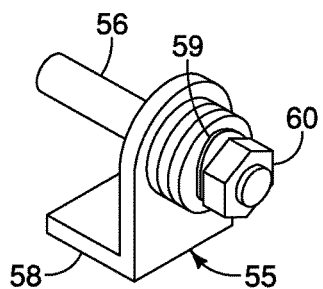
FIG. 13 is a perspective view of a friction hinge configured to rotate the wireless charging assembly.

The friction disk assembly 55, as shown in FIG. 13, includes a shaft 56 received by a rear-view mirror housing 57. A bracket 58 is disposed on the shaft 56 and connected to the charger housing 19. A wave spring 59 is disposed on the shaft 56 between a nut 60 and the bracket 58. The pressure of the wave spring 59 on the bracket 58 allows the charger housing 19 to be securely positioned in any suitable position about the rotational axis 54. Preferably, friction disk assemblies 55 are disposed at opposite ends of the shaft 56.

Figure 14:
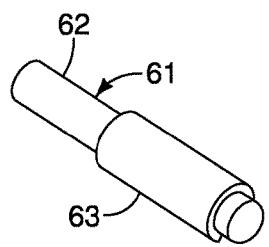
FIG. 14 is a perspective view of a friction hinge configured to rotate the wireless charging assembly.

The roll pin assembly 61, as shown in FIG. 14, includes a shaft 62 onto which a roll pin 63 is pressed. The shaft 62 is received by the rear-view mirror housing 57 and the charger housing 19. The roll pin 63 is connected to the charger housing 19. The interference between the outside diameter of the shaft 62 and the inside diameter of the roll pin 63 facilitates disposing the charger housing 19 at any desired position about the rotational axis 54.

Figure 15:
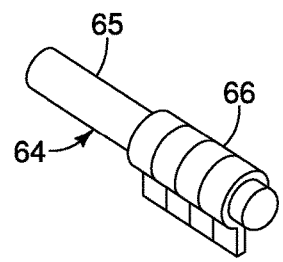
FIG. 15 is a perspective view of a friction hinge configured to rotate the wireless charging assembly.

The question-mark band assembly 64, as shown in FIG. 15, includes a shaft 65 onto which a question-mark band 66 is disposed. The shaft 65 is received by the rear-view mirror housing 57 and the charger housing 19. The question-mark band 66 is preferably made of steel and has a substantially question-mark shape. An end of the question-mark band 66 is connected to the charger housing 19. The interference between the outer diameter of the shaft 65 and the inner diameter of the question-mark band 66 facilitates disposing the charger housing 19 at any desired position about the rotational axis 54.

The friction hinge can include a locking detent, as shown in FIG. 12, to lock the charger housing 19 in a stowed position, thereby substantially preventing accidental movement of the charger housing 19 relative to the vehicle component 100. A notch 67 is disposed in the rear surface 26 of the charger housing 19. A detent 69 extends outwardly from the rear-view mirror housing 57. The rear-view mirror housing 57 has a front face 90, as shown in FIGS. 11 and 12. When the charger housing 19 is rotated about the rotational axis 54 to the stowed, or horizontal, position, the detent 69 engages the notch 67 in the charger housing 19, thereby substantially preventing accidental rotational movement of the charger housing 19. The charger housing 19 can be manually rotated to an in-use position by overcoming the retaining force with which the detent 69 engages the charger housing notch 67.

Figure 16:
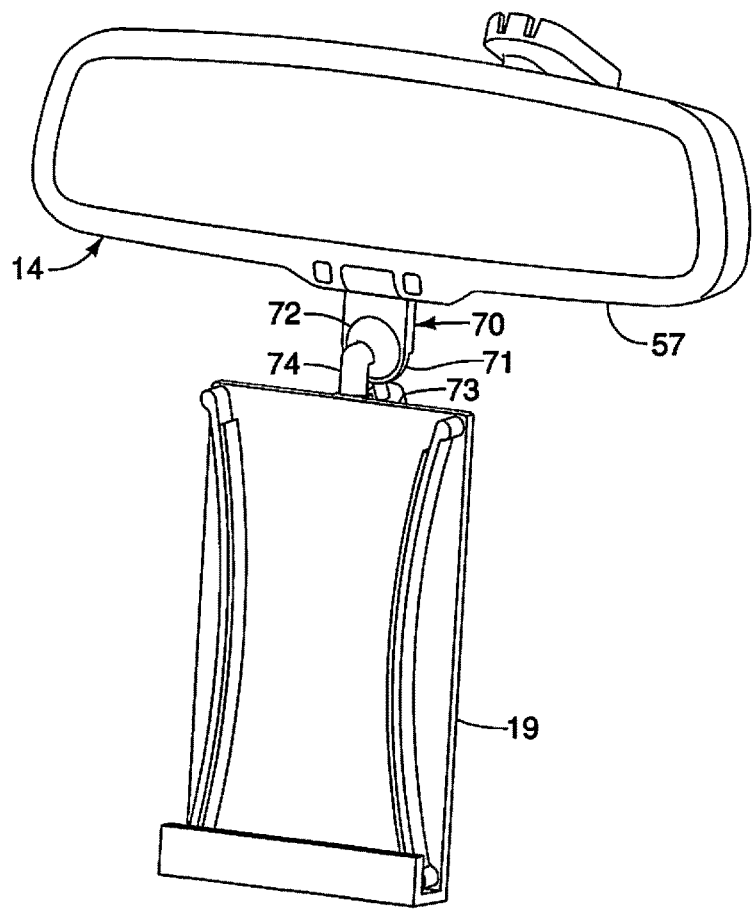
FIG. 16 is a perspective view of wireless charging assembly mounted vertically to a mirror with a telescoping arm and ball joint connection.
Figure 17:
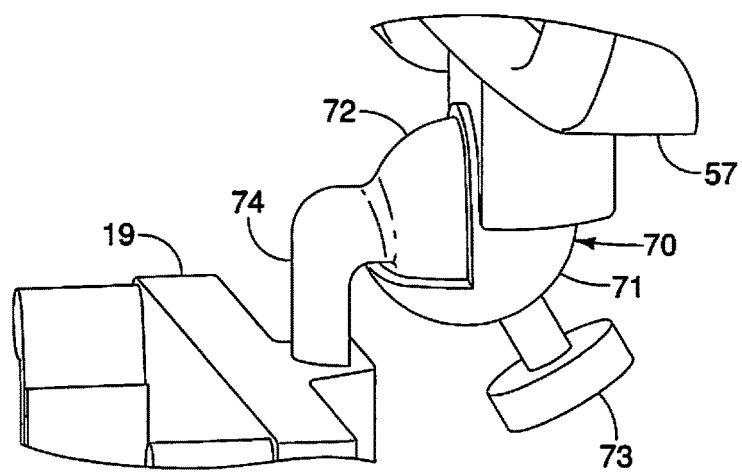
FIG. 17 is a perspective view of the telescoping arm and ball joint connection of FIG. 16.

Alternatively, the connection structure 16 can include a ball joint 70 for rotationally connecting the charger housing 19 to the rear-view mirror housing 57, as shown in FIGS. 16-18. A socket 71 is connected to the rear-view mirror housing 57 and a ball 72 is connected to the charger housing 19. The ball joint 70 allows for multi-directional positioning of the charger housing 19 with respect to the rear-view mirror 14. A set screw 73 passes through the socket 71 and is rotated in a first direction to engage the ball 72 when the charger housing 19 is in a desired position, thereby preventing accidental movement of the charger housing 19. Rotating the set screw 73 in a second direction disengages the set screw 73 from the ball 72, thereby allowing the charger housing 19 to be moved to another position. As shown in FIG. 20, a second ball joint 80 can be disposed on the rear surface 26 of the charger housing 19 to facilitate moving the charger housing 19 to a stowed, or horizontal, position by providing a second degree of relative movement. A set screw 81 connected to the second ball joint 80 locks the charger housing 19 in the stowed position to prevent accidental movement thereof.

A telescoping arm 74 can be connected between the charger housing 19 and the ball 72, as shown in FIGS. 16-18, to allow a distance of the charger housing 19 from the vehicle component 100 (rear-view mirror 14) to be adjusted along an axis of the telescoping arm 74. As shown in FIG. 18, the telescoping arm 74 is moved to a position such that the portable electronic device 29 can be disposed in a vertical orientation when the charger housing 19 is positioned in a horizontal orientation, thereby preventing the portable electronic device 29 from interfering with or blocking the rear-view mirror 14.

When the portable electronic device 29 is received by the charger housing 19 and the charger housing 19 is in an in-use position, as shown in FIG. 4, a display of the portable electronic device can be viewed from the driver seat 17 for using programs and/or applications running on the portable electronic device. The portable electronic device 29 is electrically coupled to the vehicle's power supply 25 allowing power-intensive functions, such as navigation applications, to be used while continuing to charge the portable electronic device 29. The connection to the vehicle component 100 also provides a convenient location for ease-of-use of the portable electronic device 29. The charger housing 19 can be moved to the stowed position, as shown in FIG. 11, while continuing to charge the portable electronic device 29.

General Interpretation Of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle configured for wirelessly charging a portable electronic device within a passenger compartment of the vehicle, the vehicle comprising:
    a vehicle power system;
    a driver seat;
    a windshield positioned forward of the driver seat;
    a rear-view mirror mounted to the windshield and facing the driver seat, the rear-view mirror having a mirror housing and a resilient detent extending outwardly from an outer surface of the mirror housing;
    a wireless charging assembly including
    a charger housing having a charging surface and a notch disposed in a rear outer surface of the charger housing;
    at least one primary induction coil disposed in the charger housing;
    a support structure connected to the charger housing for securing the portable electronic device to the charger housing, the support structure including
    a pair of support members movable relative to the charging surface of the charger housing; and
    a flange extending from the charger housing, the flange including a lip extending from the flange substantially parallel with the charger housing, the charger housing, the flange and the lip defining a channel configured to receive the portable electronic device;
    and a controller disposed in the mirror housing, the controller being positioned proximate to the charger housing and being electrically coupled to the vehicle power system and to the at least one primary induction coil; and a connection structure for rotatably connecting the charger housing to the mirror housing such that the charger housing is rotatable between a horizontal stowed position and an in-use position, the detent engaging the notch to substantially prevent accidental movement of the charger housing when the charger housing is in the horizontal stowed position.

2. The wireless charging assembly according to claim 1, wherein the pair of support members are flexible members, each of the flexible members including a pair of ends pivotably coupled to the charger housing and a body portion extending between the pair of ends, the body portions being movable relative to a charging surface of the charger housing.

3. The wireless charging assembly according to claim 2, wherein the pair of flexible members are arcuately shaped such the body members bow towards each other, and the body members flex apart from each other when the support structure receives the portable electronic device.

4. The wireless charging assembly according to claim 1, wherein the connection structure is a friction hinge configured to rotate the charger housing about an axis to adjust a position of the charger housing relative to the vehicle component.

5. The wireless charging assembly according to claim 4, wherein the friction hinge includes a locking detent to secure the position of the charger housing at a desired angle.

6. The vehicle according to claim 1, wherein the connection structure includes a hinge movably connecting the charger housing to the rear-view mirror, a first plane parallel to a mirror surface of the rear-view mirror being substantially perpendicular to a second plane parallel to a charging surface of the charger housing when the charger housing is in the stowed position.

7. The vehicle according to claim 1, wherein an opening in the charger housing is configured to be aligned with a camera of the portable electronic device.

\* \* \* \* \*